United States Patent
Polz et al.

(10) Patent No.: US 7,207,406 B1
(45) Date of Patent: Apr. 24, 2007

(54) FRONT HOOD ASSEMBLY

(75) Inventors: Andreas Polz, Gelsenkirchen (DE); Lazlo Kreth, Pfungstadt (DE); Ingo Renneisen, Hochheim (DE)

(73) Assignees: Edscha AG, Remscheid (DE); Adam Opel AG, Ruesselscheim (DE)

( * ) Notice: Subject to any disclaimer, the term of this patent is extended or adjusted under 35 U.S.C. 154(b) by 0 days.

(21) Appl. No.: 09/979,237

(22) PCT Filed: May 17, 2000

(86) PCT No.: PCT/DE00/01600

§ 371 (c)(1), (2), (4) Date: Feb. 28, 2002

(87) PCT Pub. No.: WO00/69706

PCT Pub. Date: Nov. 23, 2000

(30) Foreign Application Priority Data

May 17, 1999 (DE) ................... 199 22 107
Oct. 8, 1999 (DE) ................... 199 48 881

(51) Int. Cl.
*B62D 25/12* (2006.01)

(52) U.S. Cl. .............. 180/69.21; 180/274; 296/187.04; 292/DIG. 14

(58) Field of Classification Search .............. 180/69.2, 180/69.21, 69.24, 274, 271; 280/748; 296/187.04, 296/193.11; 292/137, 341.15, 341.18, 341.12, 292/340, 201, 216, DIG. 5, DIG. 14, DIG. 23, 292/DIG. 65; *B60R 21/34; B62D 25/12, B62D 25/10*

See application file for complete search history.

(56) References Cited

U.S. PATENT DOCUMENTS

| 6,237,992 | B1* | 5/2001 | Howard | 296/187.04 |
|---|---|---|---|---|
| 6,330,734 | B1* | 12/2001 | Cho | 16/376 |
| 6,439,330 | B1* | 8/2002 | Paye | 180/69.21 |
| 6,543,086 | B2* | 4/2003 | Bjureblad et al. | 16/222 |
| 2003/0121710 | A1* | 7/2003 | Hamada et al. | 180/274 |

FOREIGN PATENT DOCUMENTS

DE  2711338  9/1978

(Continued)

OTHER PUBLICATIONS

"Motor Vehicle with a Front Hood at Pedestrian Level" [Kraftfahrzeug mit einer Fufgagerhohe befindlichen Fronthaube]; Translation; PTO- 04-3673; United States Patent and Trademark Office; Jun. 2004; translated by: FLS, Inc.*

(Continued)

Primary Examiner—Christopher P. Ellis
Assistant Examiner—John Walters
(74) Attorney, Agent, or Firm—Davidson, Davidson & Kappel, LLC

(57) ABSTRACT

A front hood assembly has the front hood of a motor vehicle hinged to the chassis of the motor vehicle via at least one hinge, the front hood being lockable via at least one hood lock for locking the front hood with the body of a motor vehicle. To this end, the hood lock allows a horizontal displacement of the front hood even if it is locked. The locking element of the front hood allows a displacement of the front hood into horizontal escape space while the front hood remains locked.

14 Claims, 6 Drawing Sheets

FOREIGN PATENT DOCUMENTS

| | | |
|---|---|---|
| DE | 2711339 | 9/1978 |
| DE | 2711339 A1 * | 9/1978 |
| DE | 2737876 | 3/1979 |
| DE | 2841315 | 4/1980 |
| DE | 3047696 | 7/1982 |
| DE | 2922893 | 1/1989 |
| DE | 69400889 | 12/1994 |
| DE | 29703102 | 5/1997 |
| DE | 19721565 | 12/1997 |
| DE | 19706878 | 8/1998 |
| DE | 19710417 | 9/1998 |
| DE | 19712961 | 10/1998 |
| DE | 19747417 | 4/1999 |
| DE | 10152621 A1 * | 5/2003 |
| DE | 10152621 A1 * | 5/2003 |
| EP | 0509690 | 10/1992 |
| EP | 0630801 | 12/1994 |
| EP | 0644104 | 3/1995 |
| EP | 1129911 A1 * | 9/2001 |
| EP | 1129911 A1 * | 9/2001 |
| FR | 2833223 * | 6/2003 |
| JP | 58221773 A * | 12/1983 |
| JP | 58221773 A * | 12/1983 |
| JP | 59026370 | 6/1984 |
| JP | 60123682 | 7/1985 |
| JP | 04-212677 | 8/1992 |
| JP | 09-315266 | 12/1997 |
| JP | 11-291948 | 10/1999 |
| JP | 2002087203 * | 3/2002 |
| JP | 2002087203 A * | 3/2002 |
| JP | 2003081052 * | 3/2003 |

OTHER PUBLICATIONS

"Motor Vehicle with a Front Hood at Pedestrian Level" [Kraftfahrzeug mit einer Fufgagerhohe befidlichen Fronthaube]; Translation; USPTO-04-3673; United States Patent and Trademark Office; Jun. 2004; Translated by: FLS, Inc.*

"Mechanics of Materials"; 1992; McGraw-Hill; p. 48-50.*

* cited by examiner

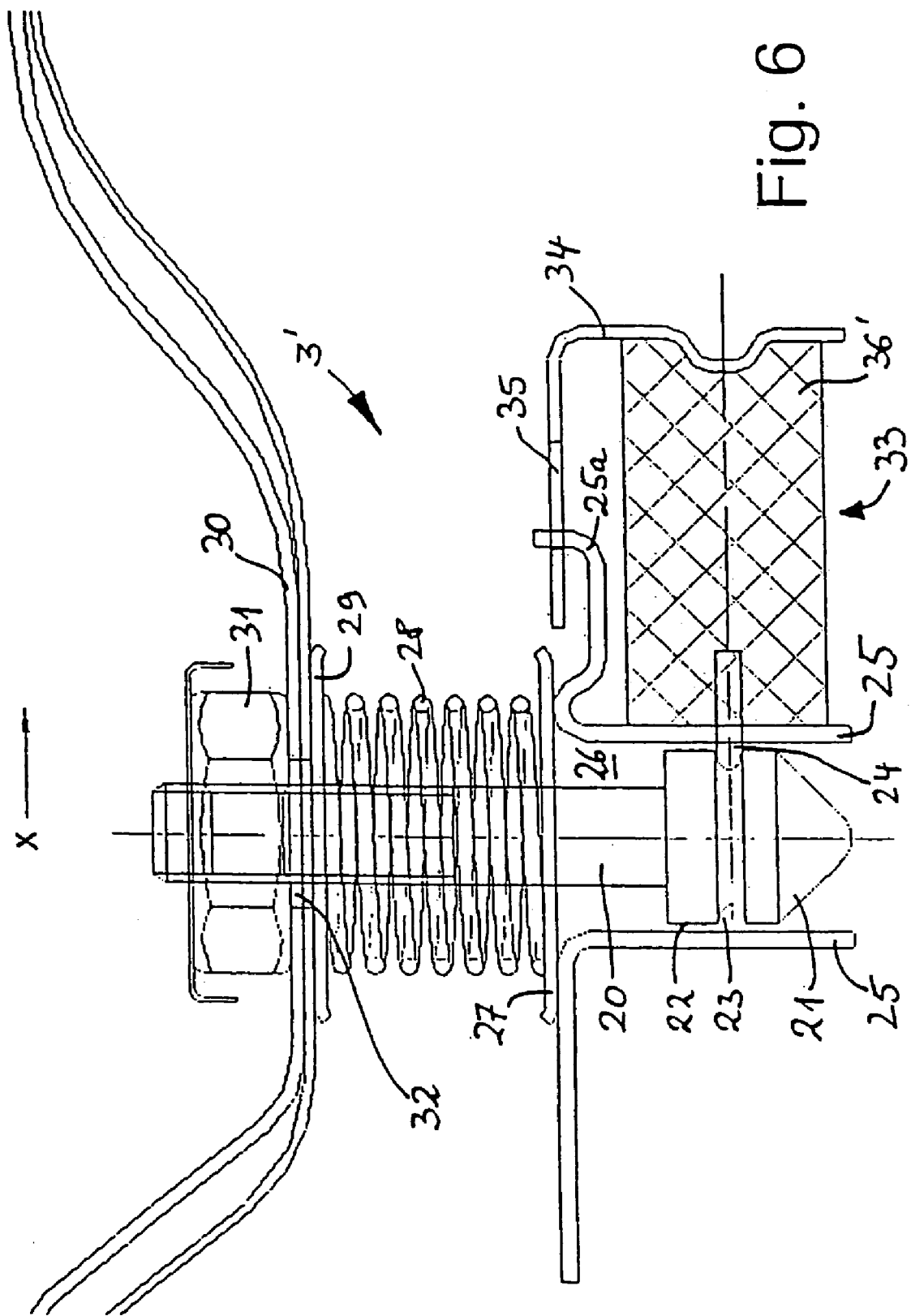

FRONT HOOD ASSEMBLY

BACKGROUND OF THE INVENTION

The invention relates to a front-hood arrangement wherein a front hood of a vehicle is coupled to the frame of the vehicle via at least one multiple-joint hinge, which front hood furthermore can be locked by means of at least one hood lock. The invention also relates to a hood lock for locking a front hood to a body of a vehicle.

By now, numerous safety devices, such as airbags and the like, for passengers in automobiles are known from practical applications. By contrast, protective measures for pedestrians who are hit by the front end of a passenger automobile have to date scarcely been proposed or implemented in practice. Accidents involving pedestrians which take place at speeds of up to 60 km/h have proven particularly problematical, since, if the pedestrian is hit head-on, his head often strikes the engine hood of the passenger automobile, and the pedestrian dies from his injuries. The seriousness of the injury results from the fact that although the front or engine hood, which is usually formed from thin metal sheet, would tend to bend, it then strikes parts which are arranged beneath the engine hood and in practice cannot be deformed or can only be deformed with difficulty, such as the engine block, the suspension-leg carrier, the air filter, the valve cover or the frame side and cross members of the vehicle. It would be desirable if the consequences of an impact in particular of the head of a pedestrian could be made less severe. By contrast, at speeds of over 60 km/h, the pedestrian, after he has been hit, is thrown over the vehicle.

DE-C-29 22 893 proposes that the engine hood and the wing, in the region of the joint formed between these two parts, be supported, by means of energy-absorbing U-sections which run along the two parts, on body components, and in the event of a collision these U-sections convert the impact into deformation energy. A first drawback of this arrangement is that considerable forces have to act on the sections in order to bend them. Moreover, these otherwise useless U-sections are expensive to procure and difficult to fit.

DE-A-27 37 876 describes an impact protection device which uses a prestressed pivot flap to displace a mesh-like absorption element out of an at-rest position, in which the mesh rests substantially on the front hood, into an absorbing position, which runs substantially in front of the windshield of the automobile. This device is used more to protect the windshield than the pedestrian from an excessively hard impact on the front hood. Moreover, any contact with the sensor which triggers the pivoting movement and is integrated in the front bumper can cause the mesh to be triggered, with the result that a whole range of situations arise in which the mesh completely blinds the driver.

DE-A-28 41 315 describes a safety device in which, in reaction to a signal from a sensor arranged at the front of a vehicle, to detect a collision with a pedestrian, the front hood is displaced out of an at-rest position into an impact position, which is raised with respect to the at-rest position, by a piston-cylinder unit, the displacement being effected by an energy store. During the raising operation, the front hood is pivoted about a horizontal pivot pin which is arranged at the front of the vehicle.

DE-A-197 10 417 describes an arrangement for lifting the front hood in which pivoting about a horizontal pivot pin arranged at the front of the vehicle is triggered by the same pneumatic spring which also assists with the raising of the front hood which is coupled to the other end.

DE-A-197 21 565 describes a safety device on motor vehicles for raising the front hood in which the raising of the front hood takes place in a speed-dependent manner by means of a mechanism which is integral with the hood lock. For this purpose, either the unlocking of the lock which is acted on by a compression spring, which for safety reasons is normally triggered from the driver's compartment, is triggered by a sensor which is triggered by an impact, or alternatively, particularly at relatively high speeds, a piston-cylinder unit which is integrated in the catch bolt of the hood lock is expanded by a propelling charge. A first drawback of this arrangement is that the force required to close the front hood must not exceed a defined threshold, in order to allow the driver to close the front hood with ease. Since the forces which strike in the event of an accident involving a person are considerable, the front hood is pressed down rapidly, and the known injuries occur, in particular in the region of the head. Providing a propelling charge in order to expand a piston-cylinder unit also causes problems, since the service life of this charge, in particular in a relatively unprotected arrangement, is limited, and the charge is difficult to exchange. Moreover, there is a risk of the compression spring and the piston-cylinder unit being triggered simultaneously, with the result that the opening of the front bonnet would become so great that the airstream would bring the hood into contact with the windshield, thus preventing the driver from being able to see.

DE-A-27 11 338 describes a device for damping the impact of a pedestrian, in which an airbag is arranged in the region of the cowl, the filling of which airbag is triggered by a sensor signal. In this case, the airbag may be arranged in such a way that, at the same time, it raises a part of the front hood; to do this it overcomes a spring force which preloads two links, which are connected to one another via a rotation point and one of which is arranged rotatably on the front hood and the other of which is arranged rotatably on a fixed part of the motor vehicle, into an angled position. Furthermore, it is proposed to arrange resilient profiled bodies in strip form in the manner of a seal between hood and side parts, in order in this way to provide further protection in the event of an impact.

DE-A-27 11 339 describes a front hood which is coupled at the front side and in which the coupling is designed to be resilient, in such a manner that it allows a horizontal displacement of the front hood through the impact of a pedestrian, the front hood which is displaced toward the rear being connected at the rear side to one end of a rigid locking element, the other end of which, in the event of displacement of the front hood, is displaced upward and toward the rear in a guide curve in such a manner that the front hood executes an upward movement. This lifting only takes place if horizontal displacement of the front hood has actually occurred, which is not always the case, for example, in the event of impacts of children.

EP-A-0 509 690 describes a front hood, which at its front side is coupled to the vehicle structure in such a manner that, as a result of an impact, the front hood is displaced toward the rear, the closure or pivot means arranged at the rear side, as a result of a movement of the front hood toward the rear, triggering an upward pivoting movement of the front hood, so that the deformation travel of the hood is increased in the event of the impact of a pedestrian. The pivoting movement is guided, for example, by a four-joint hinge, which is otherwise used to pivot the front hood when it is desired to release access to the engine and other parts. In this case too, the front hood is only lifted in the event of a very substantial displacement of the front hood, while a weak impact does not displace the front hood toward the rear and therefore upward.

DE-A-197 12 961 describes the arrangement of a front hood on a vehicle in which a hinge is arranged on a hinge mount, which hinge mount, in the event of a collision with a pedestrian, is pivoted upward in order to raise the front hood. A problem of this arrangement is that the hood lock for the front hood defines a pivot axis which does not allow optional displacement of the hinge mount, and consequently the hinge mount described is, for example, blocked.

DE-A-197 06 878 describes an engine hood which, in the event of a head-on collision, is intended to substantially cover the area of the windshield in the manner of a protective plate, in order to protect passengers in the vehicle from objects penetrating into the passenger compartment. For this purpose, the front hood is held by means of a bolt, which is designed with a desired breaking point, in the hood lock, is mounted on the body by means of a hinge arrangement in the form of a U-bow and is prestressed to erect the front hood in the event of a head-on collision by means of a stressing arrangement. First of all, it should be pointed out that the proposed solution is in no way suitable for combating the impact of a pedestrian, since the impact would have to apply at least sufficient force to shear off the bolt in the hood lock, yet a weak bolt of this type would not be suitable for everyday use. Moreover, the front hood is raised too slowly, and because of the displacement of the front-side end the engine compartment, together with its components which are dangerous to pedestrians, is in fact exposed, while the passengers in the vehicle, who are sufficiently protected by a laminated glass windshield, are provided with additional security.

EP-B-0 630 801 describes a front-hood arrangement in which the front hood is mounted by means of link arrangements arranged in the front region of the body and is held by a retaining device arranged in the region of the cowl; in this arrangement, the joint assemblies, which are designed in a similar manner to a four-joint mechanism, are designed in such a manner that on the one hand they can be pivoted about an axis which runs in the front region of the vehicle, in order for the front hood to be opened by tilting, and secondly, when a force acting on the front edge of the front hood is applied, they can be moved upward by the four-joint mechanism. For this purpose, a front hood which is likewise to be displaced upward is provided in the region of the retaining devices, this being achieved, for example, by the fact that a suspendable retaining arm, after a shear-off bolt has been sheared off from the holding means connected to the front hood, allows a further pivoting movement substantially in the upward direction. The axis in which the retaining bolt is held remains unchanged. Alternatively, it is proposed for the axis to be displaced along a guide rail which, however, primarily involves raising of the front hood.

EP-B-0 644 104 describes a front-hood arrangement in which the front hood can be pivoted upward by means of its rear edge about a hinge or joint provided in the region of its front edge, in order to provide access to the engine compartment, the hinge which guides the front hood at the front not being secured to the body, but rather to a front part of the vehicle which comprises, for example, the radiator area, and which is pivotably connected, via a further hinge, to a front cross member of the body, so that in the event of a pedestrian striking the radiator part or the front hood both parts are displaced toward the rear. For this purpose, a guide path, in which a roller of the lock can be displaced substantially in such a manner that the front hood is shifted upward, is provided in the region of the lock, which is provided at the rear.

Overall, as yet no solution has been proposed which proposes an inexpensive arrangement, which can be readily restored after use and which is so well developed that it could be used in mass-produced vehicles.

SUMMARY OF THE INVENTION

It is the object of the invention to propose a front-hood arrangement and a hood lock that supply a pedestrian with protection that can be achieved inexpensively and on an industrial scale.

This object is achieved, for the front-hood arrangement described at the beginning, according to the invention, in that the hood lock, in its locked state, allows a horizontal displacement of the front hood. This object is achieved, for the hood lock described at the beginning, according to the invention, in that a horizontal yielding space is provided, into which a locking element of the front hood allows a movement of the front hood, with the locking of the front hood being maintained.

In its closed state, the hood lock is expediently designed in such a manner that it allows horizontal displacement of the front hood, in order to allow a translational movement of the front hood towards the rear in accordance with rotation points, coupled to the front hood, of the at least one link of the hinge that due to an overload condition of the hinge are displaced further to the rear. For this purpose, the hood lock may be designed in such a manner that it is designed to unlock in a standard way, but in the closed and locked state provides a horizontal yielding space which expediently allows the displacement of the front hood toward the rear counter to a resistance, which is preferably reversibly or irreversibly deformable. For example, the yielding space may accommodate an energy storage member, such as a compression spring, which, for example, prestresses a holding part of the front hood, which is designed as a bow part and is held locked in the lock, toward a position which allows unlocking and in the event of a pedestrian impact is stressed, with the result that some of the impact energy is absorbed. This measure is particularly advantageous if the impact of the head of a child, which is to be expected predominantly in the front region of the front hood, is to be damped. Furthermore, it is possible to line the yielding space with a plastic foam part which crumbles under the pressure of an impact and can be replaced by a spare after the impact, with the result that the front hood arrangement remains able to function in the event of further impacts even after a first impact has occurred.

Alternatively, it is possible for the hood lock as a whole to be designed to be horizontally displaceable and in this way to complete the movement of the front hood—if appropriate converting impact energy by stressing an energy store or widening a guide which is designed as a press fit. For this purpose, the hood lock is advantageously arranged at the rear side, as seen in the direction of travel, of the front cross member of the body.

The front-hood arrangement according to the invention advantageously has three limit positions; in addition to the known closed position, in which the front hood is locked, this being the position which is adopted while the vehicle is driving, and the open position, which is likewise known and in which access to the engine compartment is opened up for an operator, there is also a third limit position, which can be described as the overload position and which is explained in detail below, in order to satisfy the demands imposed on the front hood drawing back in the event of the impact of a pedestrian.

The multiple-joint hinge may advantageously be designed as a four-joint hinge, although it is alternatively possible for it to be designed as a seven-joint hinge or with only one link as a two-joint hinge.

In the starting position, the front hood is locked by the hood lock, which is preferably arranged in the front region of the front hood, a four-joint hinge, comprising two links and two hinge parts, which are connected to the links in an articulated manner at the rotation points arranged in the end regions of the links and which are connected, by known mounting means, to the front hood and to the body of the vehicle, defining a pivoting path of the front hood, which allows free, reciprocating pivoting of the front hood between the open position and the closed position to-optionally open up access to the engine compartment. In the open position, which is preferably reached with the assistance of a spring, for example a pneumatic spring, the front hood can be held by means of a rod between the body and the front hood, in order to allow an operator access without danger. Alternatively, when a past-dead-center position of the four-joint hinge or of the four-joint hinges is reached, since generally one hinge is arranged at both rear corners of the front hood, which in developed view is of square design, the front hood can be held without external aids.

While the vehicle, which expediently is a passenger automobile, is driving, the front hood is in its closed position and is locked by the hood lock, so that the engine compartment, in which a series of hard components, such as the engine block, the suspension-leg cover and others are arranged, by the front hood in the manner of a protective cover, which is arranged at a sufficient distance from the parts which are dangerous to the head of a pedestrian at least in the event of an impact, on the underside of the front hood has a space optionally lined with a foam, which is designed to be compressible and if appropriate absorbs impact and/or sound energy, or has a free space.

Starting at least from the closed position of the front hood, the front-hood arrangement according to the invention allows the front hood to be displaced toward the overload position, in which the distance between the front hood and the dangerous parts of the engine compartment is reduced; according to the invention, in the event of an overload, the four-joint hinge, as well as, if appropriate, further parts of the front-hood arrangement, preferably including the hood lock, for the displacement toward the overload position or into the overload position, convert a proportion of impact energy from the pedestrian into displacement or deformation energy which is such that the impact, when the vehicle is driving at a speed of up to 60 km/h, is very likely not to cause the death of the pedestrian.

Under the load of an impact of a pedestrian, the front hood, according to a preferred refinement, is displaced toward the overload position as a result of a change in the multiple-joint arrangement of the at least one link of the multiple-joint hinge, the displacement travel, as a result of the impact energy being converted due to the gradual yielding of the front hood, alleviating the impact and thus reducing the severity of the impact. It will be understood that deformation energy of the front hood itself is to be taken into account in this context, this generally only being possible to a limited extent by clamping into a conventional hood lock and two four-joint hinges. The elimination, for example, of the four-joint arrangement can be achieved by the fact that one link of the multiple-joint hinge is designed so that it can be separated to two parts, destroyed or can change in length, or by the fact that a joint of a link of the four-joint hinge is at a variable distance from the adjacent joint of the other link. If, in a four-joint hinge, both links are designed in the manner described above, the horizontal displacement of the front hood can advantageously be greatly reduced, so that the yielding space can be designed to be small.

It will be understood that a front-hood arrangement whose translational movement in the hood lock is completely reversible is particularly preferred, since in particular an arrangement of this type can easily be checked for correct operation and reliability during routine tests carried out on the vehicle for technical inspection thereof. Therefore, it is expedient if, when using components which undergo an irreversible change in the event of a collision, these components are arranged in such a manner that they can be checked for damage by visual inspection.

To ensure a displacement starting from the closed position toward the open position or toward the overload position of the front hood relative to the body of the vehicle, it is expedient for the four-joint hinge, at the hinge part which bears against the front hood, to be arranged in a fixed position on the front hood of the vehicle, so that the pivoting movement about the front-hood-side rotation points of the links can be carried out. However, it is also possible to provide a dedicated mounting part, which may be displaceable relative to the other, to be provided for each joint.

Further advantages and features of the invention will emerge from the following description and from the dependent claims.

BRIEF DESCRIPTION OF THE DRAWINGS

The invention is explained in more detail below with reference to the appended drawings and on the basis of preferred exemplary embodiments of a front-hood arrangement according to the invention.

FIG. 6 shows a diagrammatic side view of a further embodiment of the hood lock of the front-hood arrangement from FIG. 1 with the front hood closed.

DETAILED DESCRIPTION OF THE DRAWINGS

Figure 1:
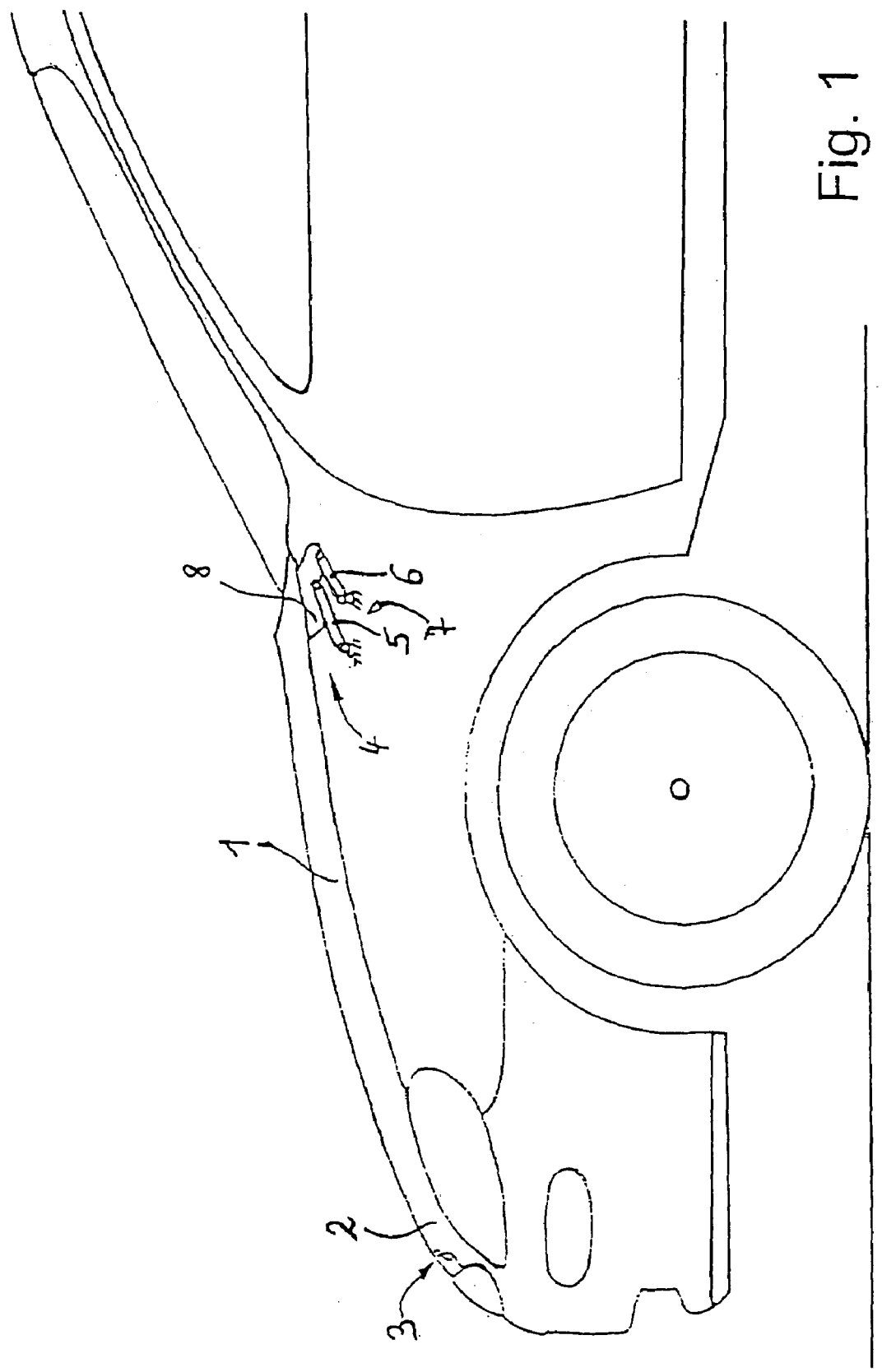
FIG. 1 shows a diagrammatic side view of part a vehicle with a preferred exemplary embodiment of a front-hood arrangement according to the invention.

FIG. 1 shows a side view of the front part of a motor vehicle, the engine compartment of which can be closed off by a front hood 1. The front hood 1 is locked and unlocked by means of a hood lock 3 arranged in the front region 2 of the front hood 1 and, on its side which faces the driver's compartment, is coupled at each edge side to the frame of the body by means of one of two hinges 4. The hinge 4 is in the present case designed as a four-joint hinge which comprises a longer link 5 and a shorter link 6, the joints of which are pivotably coupled to a part 7 which is secured to the frame and to a part 8 which is arranged on the front hood 1. The front hood 1, by pivoting about the joints on the frame part 7, can be pivoted out of the closed position illustrated in FIG. 1 into its open position and back again.

Figure 2:
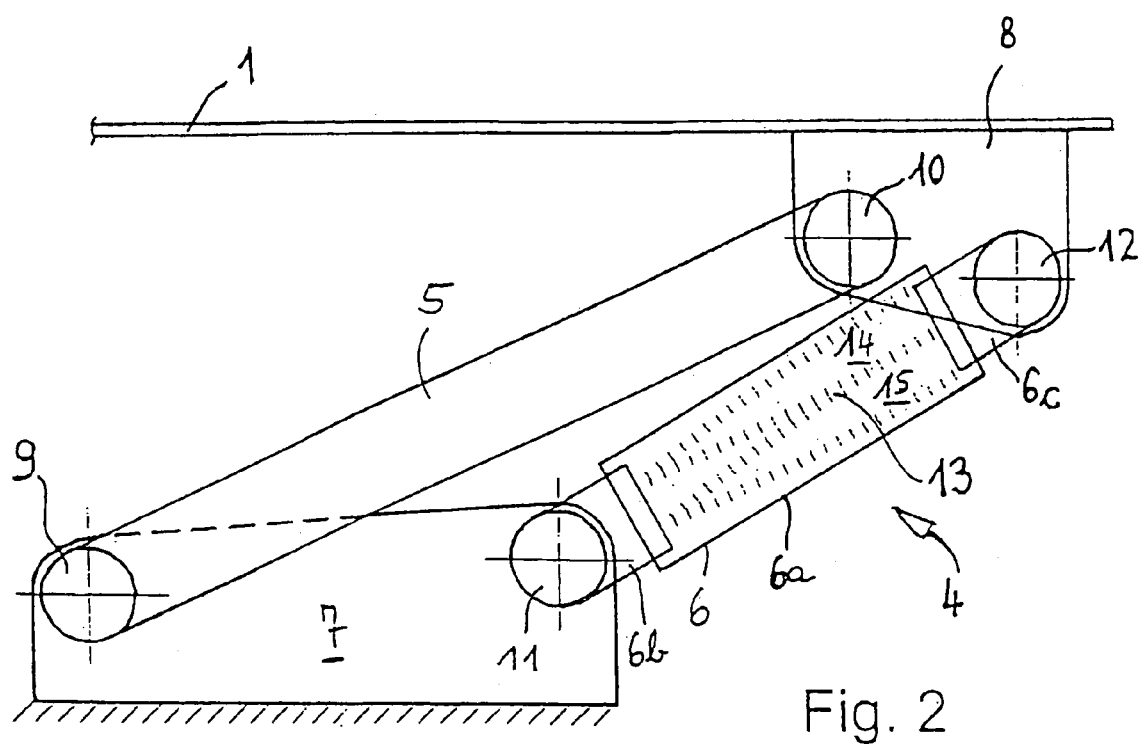
FIG. 2 shows a diagrammatic side view of a first embodiment of a four-joint hinge of the front-hood arrangement from FIG. 1, with the front hood closed.

FIG. 2 shows a first preferred embodiment of the hinge 4, the rotary joints of the longer link 5 being denoted by 9 and 10 and the rotary joints of the shorter links 6 being denoted by 11 and 12. It can be seen that all four links 9 to 12 are arranged in a fixed position in the associated body part 7 or front-hood part 8.

While the longer link 5 is designed as a rigid link, the shorter link 6, in a central region 6*a* which is adjoined by the end pieces 6*b* and 6*c* which have the same joint action as the rotary joints 11, 12, is equipped with an integrated energy store 13 which is designed as a double spring and allows a change in the length of the shorter link 6, in such a manner that the distance between the axes of the rotary joints 11 and 12 can be changed. To achieve this, the energy store 13, which is formed by means of strong tension springs, has to be loaded to such an extent that its prestress is overcome, the load being such that it must significantly exceed the dead weight of the front hood 1 arranged on the hood part 8. In addition to a compression spring 14, a tension spring 15 is also integrated in the section 6*a* of the shorter link 6, so that the preset distance between the axes of the rotary joints 11, 12 is maintained by the length of the shorter link 6 shown in the load-free state. As can be seen more specifically from FIG. 3, part of the dead weight of the front hood 1, in the open position of the four-joint hinge 4 from FIG. 2 illustrated in FIG. 3, exerts a load on the shorter link 6, which is only intended to yield to an insignificant extent under this load, in order to avoid a pivoting-tilting movement of the front hood 1. The compression spring 14 and the tension spring 15 are diagrammatically indicated in FIGS. 2 to 4 and, in this diagrammatic illustration, serve only to illustrate the different load-free and loaded states of the four-joint hinge 4. It can be seen in particular in FIG. 3 that both in the closed position, which is indicated by the symbol S, and in the open position, which is indicated by the symbol 0, the length of the shorter link 6 remains substantially unchanged.

Figure 4:
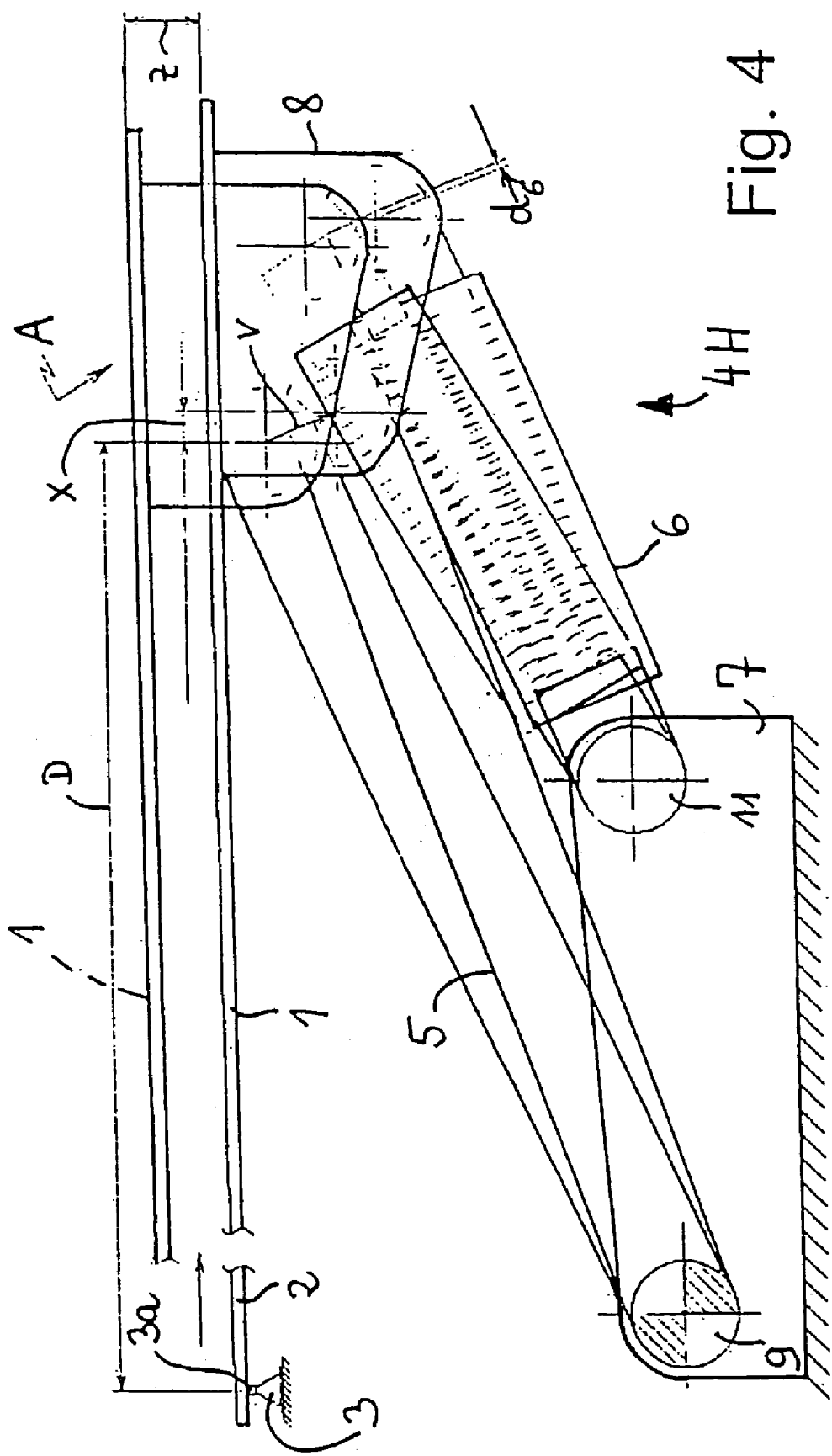
FIG. 4 shows a diagrammatic side view of the four-joint hinge from FIGS. 2 and 3 with the front hood overloaded.

FIG. 4 illustrates the overload situation caused by the impact of a pedestrian on the front hood 1 and the resulting deformation of the four-joint hinge 4 overall and in particular of the shorter link 6 in more detail. In FIG. 4, the closed position S is illustrated in dashed lines, while the overload position H caused by the impact of a pedestrian, which is diagrammatically indicated by arrow A, is illustrated in continuous lines. Moreover, FIG. 4 diagrammatically depicts the hood lock 3 which, as can be seen from the diagrammatic illustration, is arranged displaceably relative to the body, in order to allow a horizontal displacement of the front hood 1 which is associated with pivoting of the front hood 1 about the axis which is formed in the hood lock and is denoted by 3*a*. It can be seen that the front hood 1, in the region of the hood part 8 mounted on it, executes a displacement travel v, which is illustrated by the arrow drawn on the axis of the rotary joint 10. The travel v is composed of a horizontal component x and a vertical component z, which are likewise shown in FIG. 4. It can therefore be seen that, in the event of a collision with a pedestrian, the front hood is lowered by the amount z, and accordingly reduces its distance from the parts in the engine compartment which may be hard and therefore risk causing injury, while, at the same time, the front hood 1 and therefore also the hood lock 3 are displaced by the amount x toward the rear, as seen in the direction of travel. If the shorter link 6 were, like the longer link 5, of rigid design, the translational movement could not be completed by the four-joint hinge 4, since the four joints 9 to 12 only define one pivoting travel, namely that which forms the basis for the opening movement of the front hood 1, and therefore the translational movement would be statically overdetermined. Since the shorter link 6 is designed so that it can be changed in length, the static overdetermination of the four-joint mechanism 4 is eliminated, and the impact energy produced by the impact of a pedestrian on the front hood 1 is converted into the corresponding deformation energy (and into further energy components which reduce the impact for other reasons). The change in length of the shorter link 6 is denoted by d6 in FIG. 4. It can be seen that for a relatively significant vertical displacement a slight elongation of the shorter link 6 is sufficient, running along a continuous extension curve d by z, so that there is a realistic conversion of the impact energy into deformation energy of the energy store 13. It can also be seen that, as a result of the elongation of the shorter link 6, the angular position of the two links 5 and 6 with respect to one another has changed slightly, this position otherwise statically determining the four-joint mechanism 4.

In the present example, the displacement of the front hood 1 toward the rear is approx. 0.61% of the length D of the front hood 1 or of the effective distance between the hood lock 3 and the rotary joint 10. By comparison, the lengthening of the shorter link 6 is only approximately 0.13% and is therefore less than a quarter of the travel distance x. The change in height z is dependent on the measurement point on the front hood, and in the region of the hood part 8 is approximately twice the length x, i.e. approx. 1.2%.

Figure 5:
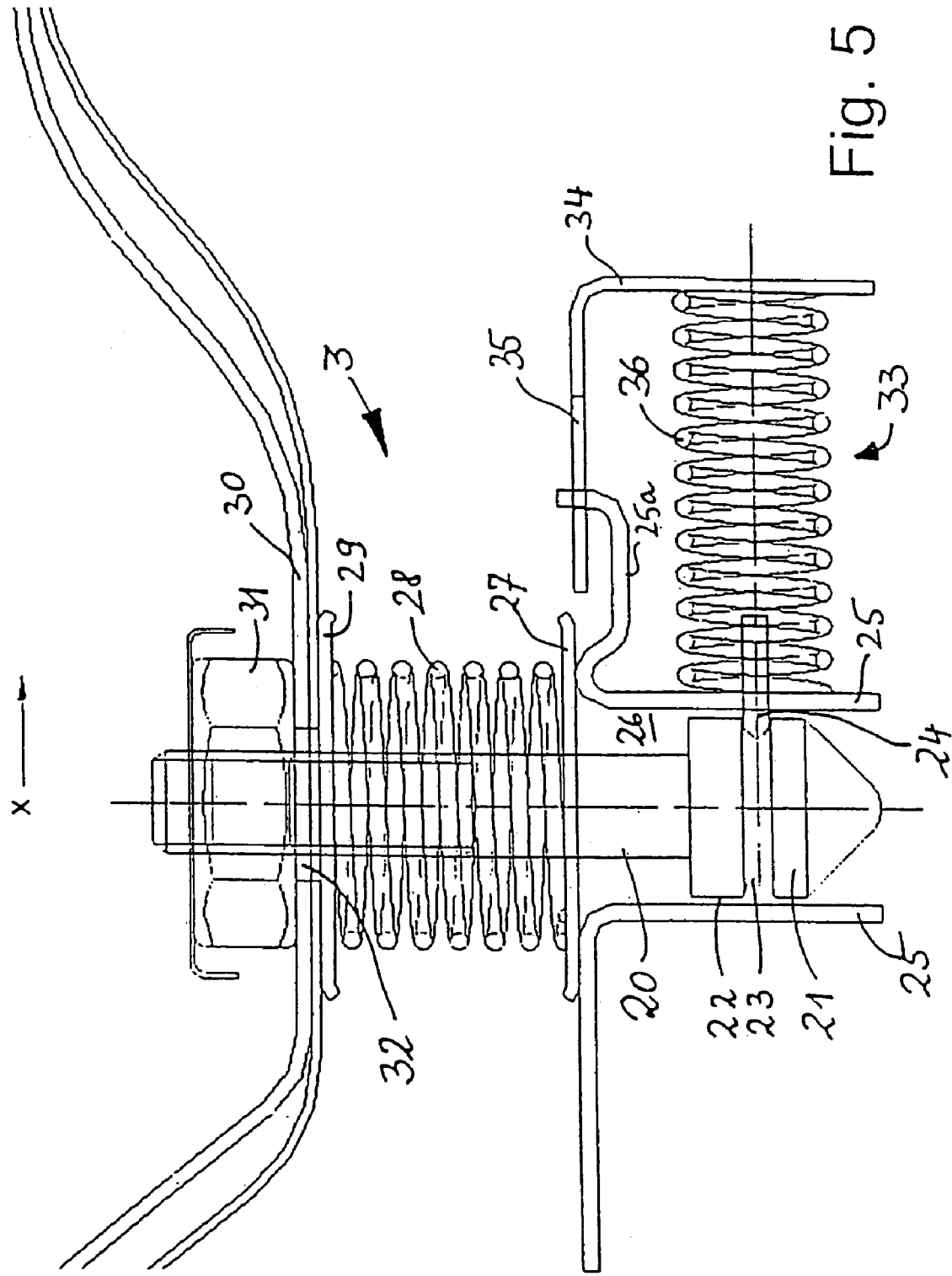
FIG. 5 shows a diagrammatic side view of a first embodiment of a hood lock of the front-hood arrangement from FIG. 1 with the front hood closed.

FIG. 5 shows a diagrammatic side view, parallel to the direction of travel of the vehicle, of a simple exemplary embodiment of a hood lock 3. The hood lock 3 comprises a locking pin 20, which has a locking head 21, the end of which is molded on conically and has a diameter with periphery 22 which is wider than the diameter of the locking pin 20. A circumferential groove 23 is formed in the periphery 22, in which groove a horizontal engagement pin 24 engages, holding the locking head 21 in its position illustrated in FIG. 5 when the front hood 1 is closed. The engagement pin 24 passes through the circumferential wall 25 of a holding passage 26 for the locking pin 20, the locking pin 20, by means of the locking head 21, being accommodated with a certain play in the holding passage 26, in order to allow the front hood 1 to open and close and therefore to allow easy tilting of the locking pin 20. The upper end of the holding passage 26 is covered by a disk 27 which can move axially on the locking pin and against whose side which is remote from the locking head 21 a spring 28 is supported, the other end of which spring is supported against a further disk 29.

Figure 3:
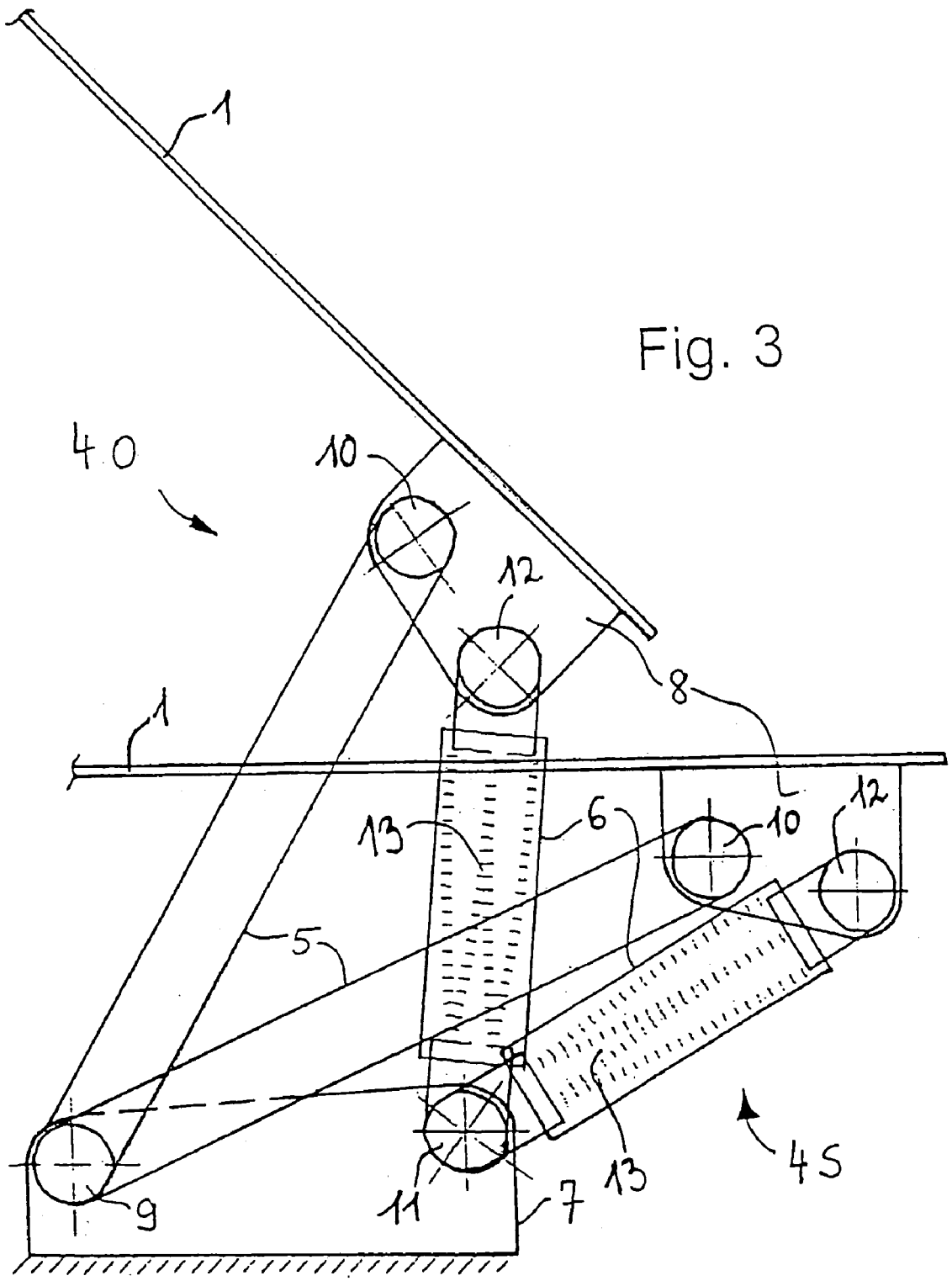
FIG. 3 shows a diagrammatic side view of the four-joint hinge from FIG. 2 with the front hood open.

On that side of the disk 29 which is remote from the spring, there is a continuation 30 of the front hood 1, which allows the locking pin 20 to be fixed by means of a nut arranged on the other side of the continuation 30 or some other screwed or riveted connection. For this purpose, the locking pin 20 passes through an aperture 32 in the continuation 30, which in the present case is designed as a centered round hole, but may also be designed as a slot in order to allow horizontal movement of the front hood and to allow compensation for play. A further retaining member (not shown), which can be manually actuated, prevents the front hood 1 from being able to open completely when the engagement pin 24, which can be actuated by a lever (not shown) from the driver's compartment in a known way, is released; rather, the front hood is retained at a height which corresponds to the unstressed extension of the spring 28. After retaining the means has been (manually) overcome, the front hood 1 can be opened, as illustrated in FIG. 3, and when the front hood is closed, the spring 28 has to be displaced downward by stressing of the spring 28, in such a manner that the engagement pin 24 engages in the groove 23 and holds the front hood back in its closed position, as illustrated in FIG. 1.

Unlike known hood locks, the hood lock 3 has a yielding space 33 which extends from the rear circumferential wall 25, as seen in the direction of travel, of the holding passage 26 to a stop 34, which may be attached to the body. The circumferential wall 25 is designed to be separated into two parts and allows horizontal displacement of the rear part, through which the engagement pin 24 passes. For this purpose, the circumferential wall 25 has an angled-off section 25a, the end limb of which projects upward and projects into a slot-like recess 35. An energy storage member 36, which in the present case is designed as a coil spring and prestresses the rear circumferential wall 25 toward a stop, which is not shown and defines its position shown in FIG. 5, is arranged between the rear circumferential wall 25 and the stop wall 34. The spring 36 is stressed in such a manner that during normal opening and closing of the hood lock 3, the circumferential wall 25 does not carry out any movement, this being assisted by the disk 27, which is also supported on the fixed front part of the circumferential wall 25.

In the event of a pedestrian impact, the front hood, as described above, is displaced by an amount y, measured on the mounting part of the hinge, downward, with a displacement x in the horizontal direction also occurring. This displacement x is considerably greater than the displacement allowed by elastic deformation of the metal sheet of the front hood 1, so that in a conventional hood lock with little play the change in height y would be restricted by the limits of the associated change x by the hood lock. By contrast, in the hood lock 3 shown in FIG. 5, the yielding space 33 allows a horizontal displacement of the locking pin 20 with the parts 21, 27, 28, 29, 30, 31 attached to it and therefore allows the horizontal displacement x of the front hood 1 to be completed. For this purpose, the spring 36 is compressed, the axial translational movement being guided by the recess 35, and furthermore the prestressing of the spring 28 onto the disk 27, which is also supported on the front region of the circumferential wall 25, also assisting substantially horizontal displacement of the hood lock 3.

The engagement pin 25, is also embedded in the translational movement of the spring 36, so that the locking head 21 cannot unintentionally be released. Alternatively, it is possible to allow a controlled release in the event of a minimum displacement in the horizontal direction, in order to raise the hood lock by the extent of stressing of the spring 28 and in this way to increase the possibilities of displacement in the region of the hinges 4.

The selection of a spring 36 as the energy storage member means that the hood lock 3, after any yielding caused by an impact of a pedestrian, can be moved back into its starting position, with the result that the hood lock 3, together with the hinges 4, forms a resilient system, in which, by suitably selecting the spring forces in the region of the hood lock 3 and/or the hinges 4, the impact energy of a pedestrian can be distributed uniformly over a plurality of energy stores.

The further embodiment shown in FIG. 6 is of fundamentally the same design as the hood lock shown in FIG. 5, for which reason the same reference numerals have the same meaning. Unlike the hood lock 3 shown in FIG. 5, the hood lock 3' from FIG. 6 has, as the energy storage member, a plastically deformable deformation element 36', which allows the horizontal displaceability of the hood lock system, by deformation of its deformable component, which is preferably made from plastic. The deformation element 36' converts the impact energy transmitted to the hood lock 3' into deformation energy of its mass, with the result that the impact is alleviated and, at the same time, the locking pin 20 can be displaced in the direction of arrow x by the amount x. After an impact, the deformation element 36' can easily be replaced, and consequently repairing the front-hood arrangement after the impact of a pedestrian entails little cost and difficulty.

The invention has been explained above on the basis of a hood lock which has an energy storage member 36 which absorbs the energy for a horizontal displacement of the locking pin 20, starting from impact energy, by converting this energy. Alternatively, it is possible to provide horizontal displacement for a hood lock 3, which involves substantially no conversion of energy, but rather the movement which is predetermined for the front hood by the hinges is simply completed, or in which a movement via slots which define a press fit makes the entire hood-lock arrangement into a type of carriage which, in the event of an impact, is displaced toward the rear. It will be understood that combinations of reversible and irreversible energy conversions and displacement movements of the entire hood lock arrangement and of the locking pin are possible according to the invention.

The invention has been explained in more detail above on the basis of an exemplary embodiment of a four-joint hinge which has reversible energy stores designed as springs, which are particularly preferred. It will be understood that, in the same way as the springs, it is also possible to provide plastically changeable material components which effect an irreversible change in length of the link 6 and which as a result entail lower mechanical outlay during assembly and manufacture.

The invention has been explained above on the basis of a four-joint hinge which changes the distance between the joint axes of a link in order to lower the front hood 1 under the load of a pedestrian impact. It is also possible, for this purpose, to enable a link to break or for a link to be designed to be separated into two parts, or for the distance between either two body-side joint axes or two hood-side joint axes to be designed to change with respect to one another under the load of a pedestrian impact.

What is claimed is:

1. A front hood assembly for attachment to a vehicle, comprising
   a front hood;
   at least one hood lock for closing said front hood, and
   at least one hinge for coupling said front hood to a frame of said vehicle,
   wherein the at least one hinge, when the vehicle is ready to drive, is arranged in a resilient raised position, and
   wherein the at least one hood lock, in its locked state, allows a horizontal displacement of the front hood towards said hinge,
   wherein the frame comprises a front member disposed at a frontal portion of the frame, and
   wherein the hood lock is arranged on a rear side, with respect to the direction of travel of the vehicle, of the front member.

2. The front hood assembly as claimed in claim 1, wherein the at least one hood lock comprises a yielding space adjoining its closed position, and
   wherein the yielding space defines a guide means for a substantially horizontal displacement in a direction toward the rear of one of the front hood and of a holding part connected to the front hood.

3. The front hood assembly as claimed in claim 1, further comprising an energy storage member that prestresses the at least one hood lock in the direction opposite to the direction of horizontal displacement,
wherein, in the event of an impact, the energy storage member can be stressed, such that some of the energy from said impact is absorbed, and
wherein the energy storage member comprises a spring that is designed so that it can be stressed.

4. The front hood assembly as claimed in claim 1, further comprising an energy storage member that prestresses the at least one hood lock in the direction opposite to the direction of horizontal displacement,
wherein, in the event of an impact, the energy storage member can be stressed, such that some of the energy from said impact is absorbed, and
wherein the energy storage member comprises a deformable component that converts the impact energy into deformation energy through plastic deformation of the deformable component.

5. The front hood assembly as claimed in claim 1,
wherein, when a threshold load corresponding to a predetermined load is exceeded, said at least one hinge comprises means for allowing a vertical and horizontal displacement of the front hood.

6. The front hood assembly as claimed in claim 1,
wherein the multiple-joint hinge includes a four-joint assembly.

7. The front hood assembly as claimed in claim 1,
wherein the at least one hinge is designed as a multiple-joint hinge.

8. The front hood assembly as claimed in claim 7,
wherein said multiple-joint hinge comprises at least two joints, and
wherein the multiple-joint hinge is arranged on the frame of the vehicle in a manner such that the front hood, when the hood lock is released, can be opened without the position of at least one joint of the multiple-joint hinge changing.

9. The front hood assembly as claimed in claim 7,
wherein said multiple-joint hinge comprises at least one link, and
wherein at least one link of the multiple-joint hinge is designed to change in length.

10. The front hood assembly as claimed in claim 7,
wherein said multiple-joint hinge comprises at least one link, and
wherein at least one link of the multiple-joint hinge is designed so that it can be separated into at least two parts.

11. The front hood assembly as claimed in claim 7,
wherein said multiple-joint hinge comprises at least one link, and
wherein at least one link of the multiple-joint hinge has at least one joint for coupling said at least one link to one of the front hood and the body, which can change in position.

12. The front hood assembly as claimed in claim 7,
wherein said multiple-joint hinge comprises at least two adjacent links, each having coupling points on at least one mounting part, and
wherein two coupling points of at least two adjacent links of the multiple-joint hinge on the same mounting part are separated by a distance that can be changed as a result of an overload.

13. A front hood assembly for attachment to a vehicle, comprising
a front hood;
at least one hood lock for closing said front hood, and
at least one hinge for coupling said front hood to a frame of said vehicle,
wherein the at least one hinge, when the vehicle is ready to drive, is arranged in a resilient raised position,
wherein the at least one hood lock, in its locked state, allows a horizontal displacement of the front hood towards said hinge,
wherein the at least one hinge is designed as a multiple-joint hinge,
wherein said multiple-joint hinge comprises at least one link, and
wherein at least one link of the multiple-joint hinge has at least one link that breaks under a predetermined load.

14. The front hood assembly as recited in claim 13, wherein the multiple-joint hinge includes at least one link configured to provide a connection between the front hood and the frame under a load exceeding the predetermined load.

* * * * *

UNITED STATES PATENT AND TRADEMARK OFFICE
CERTIFICATE OF CORRECTION

| | | |
|---|---|---|
| PATENT NO. | : 7,207,406 B1 | Page 1 of 6 |
| APPLICATION NO. | : 09/979237 | |
| DATED | : April 24, 2007 | |
| INVENTOR(S) | : Andreas Polz, Lazlo Kreth and Ingo Renneisen | |

It is certified that error appears in the above-identified patent and that said Letters Patent is hereby corrected as shown below:

On the title page, in paragraph
(73) Assignees:
"Ruesselscheim" should be changed to --Ruesselsheim--.

In the drawings, Figure 1 should appear as follows:

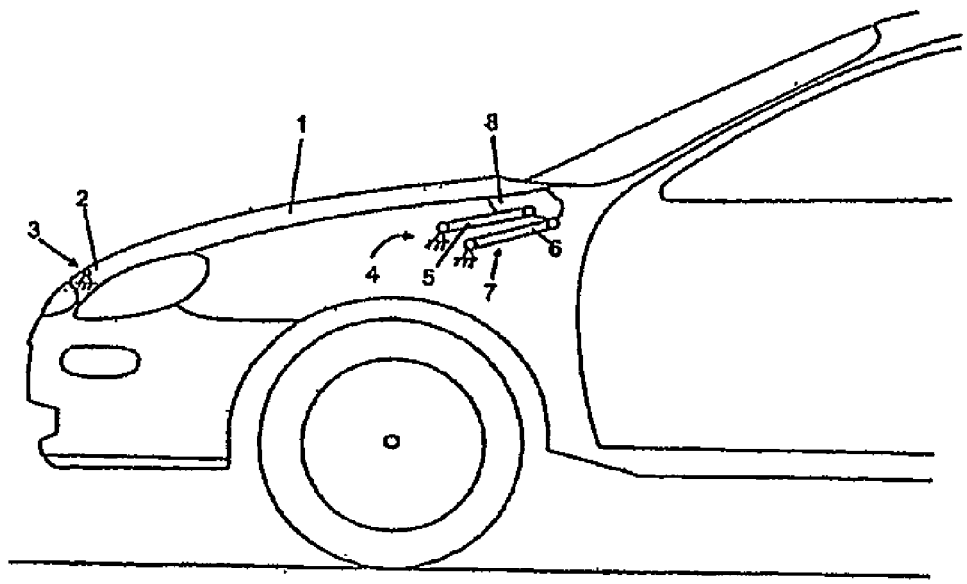

UNITED STATES PATENT AND TRADEMARK OFFICE
CERTIFICATE OF CORRECTION

PATENT NO. : 7,207,406 B1
APPLICATION NO. : 09/979237
DATED : April 24, 2007
INVENTOR(S) : Andreas Polz, Lazio Kreth and Ingo Renneisen It is certified that error appears in the above-identified patent and that said Letters Patent is hereby corrected as shown below:

In the drawings, Figure 2 should appear as follows:

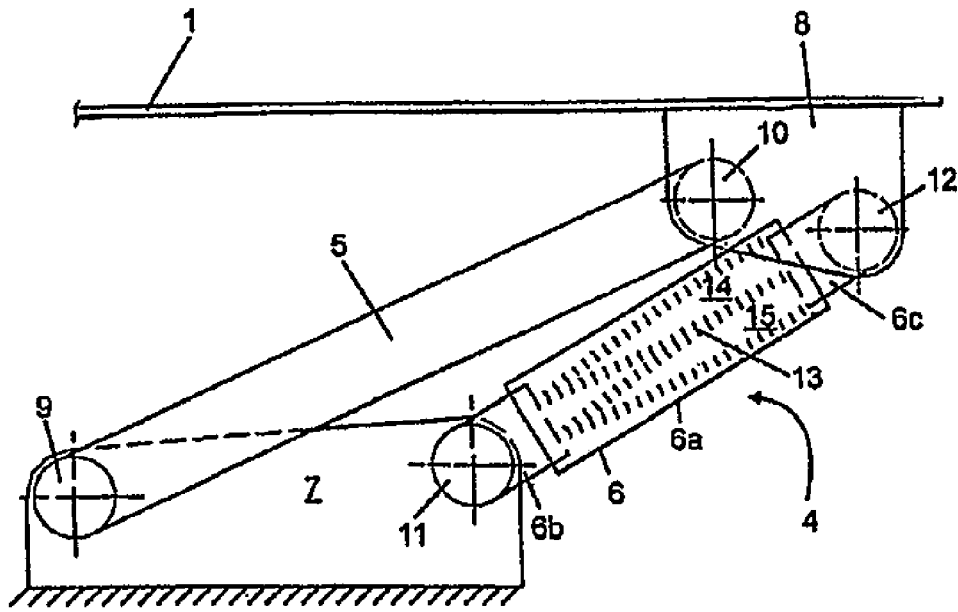

Fig. 2

UNITED STATES PATENT AND TRADEMARK OFFICE
CERTIFICATE OF CORRECTION

PATENT NO.        : 7,207,406 B1
APPLICATION NO.   : 09/979237
DATED             : April 24, 2007
INVENTOR(S)       : Andreas Polz, Lazio Kreth and Ingo Renneisen It is certified that error appears in the above-identified patent and that said Letters Patent is hereby corrected as shown below:

On the title page and in the drawings, Figure 3 should appear as follows:

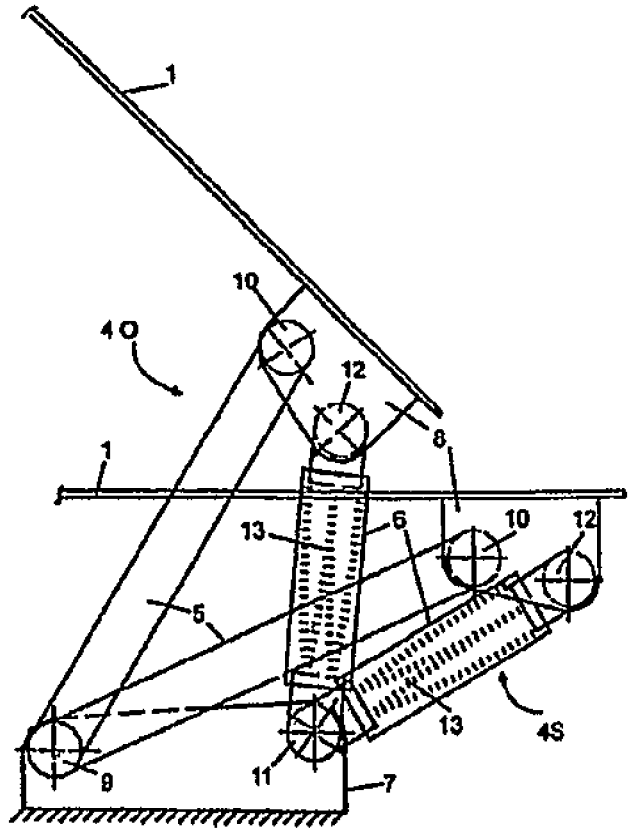

Fig. 3

UNITED STATES PATENT AND TRADEMARK OFFICE
CERTIFICATE OF CORRECTION

PATENT NO.       : 7,207,406 B1                                            Page 4 of 6
APPLICATION NO.  : 09/979237
DATED            : April 24, 2007
INVENTOR(S)      : Andreas Polz, Lazio Kreth and Ingo Renneisen It is certified that error appears in the above-identified patent and that said Letters Patent is hereby corrected as shown below:

In the drawings, Figure 4 should appear as follows:

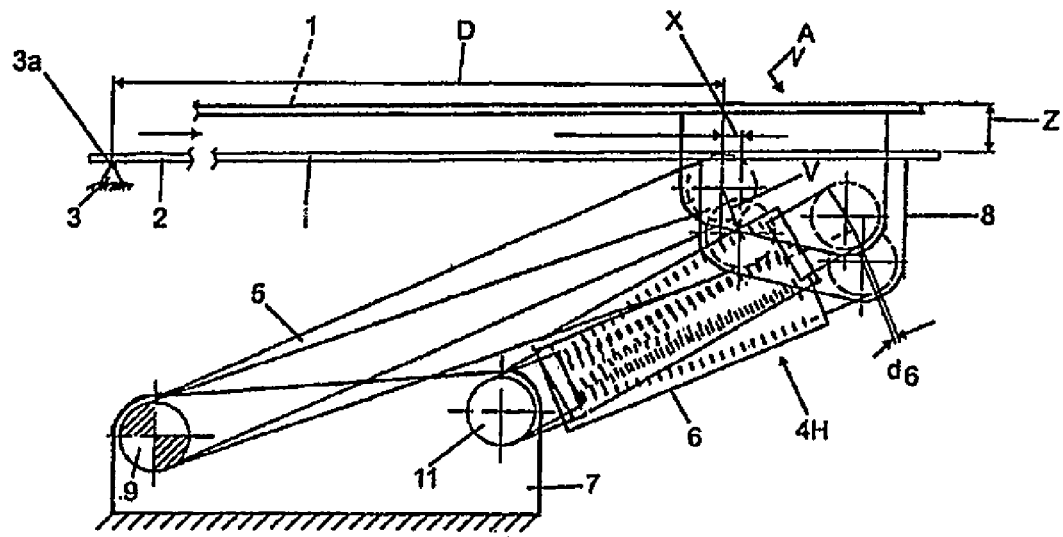

Fig. 4

UNITED STATES PATENT AND TRADEMARK OFFICE
CERTIFICATE OF CORRECTION

PATENT NO. : 7,207,406 B1 Page 5 of 6
APPLICATION NO. : 09/979237
DATED : April 24, 2007
INVENTOR(S) : Andreas Polz, Lazio Kreth and Ingo Renneisen It is certified that error appears in the above-identified patent and that said Letters Patent is hereby corrected as shown below:

In the drawings, Figure 5 should appear as follows:

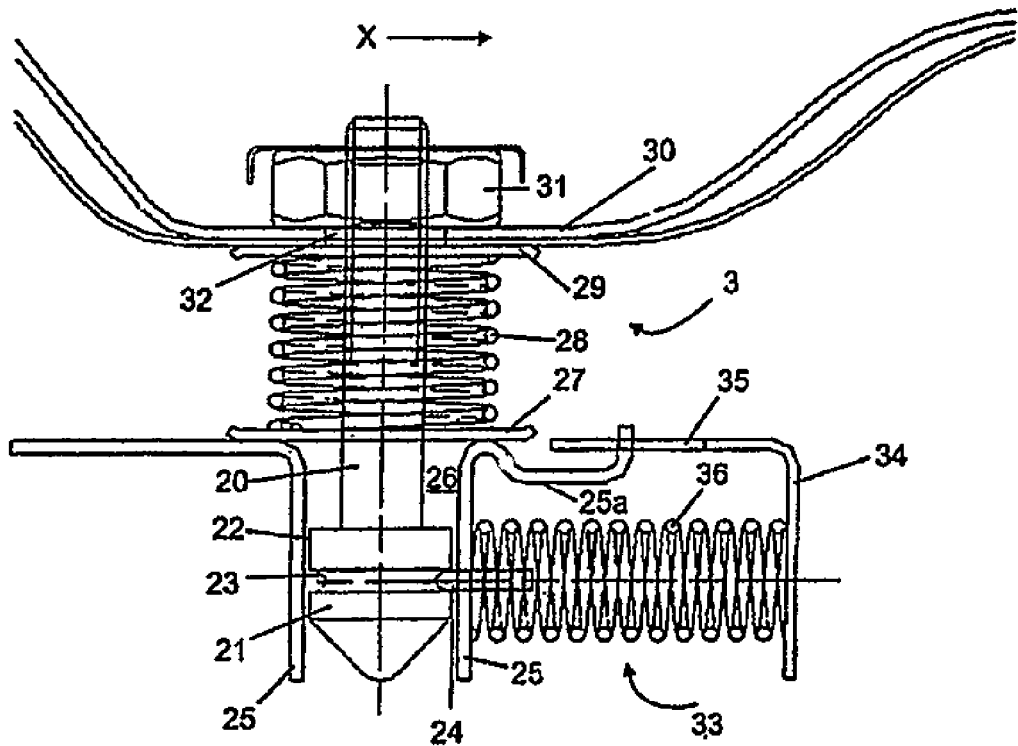

UNITED STATES PATENT AND TRADEMARK OFFICE
CERTIFICATE OF CORRECTION

PATENT NO.         : 7,207,406 B1
APPLICATION NO.    : 09/979237
DATED              : April 24, 2007
INVENTOR(S)        : Andreas Polz, Lazio Kreth and Ingo Renneisen It is certified that error appears in the above-identified patent and that said Letters Patent is hereby corrected as shown below:

In the drawings, Figure 6 should appear as follows:

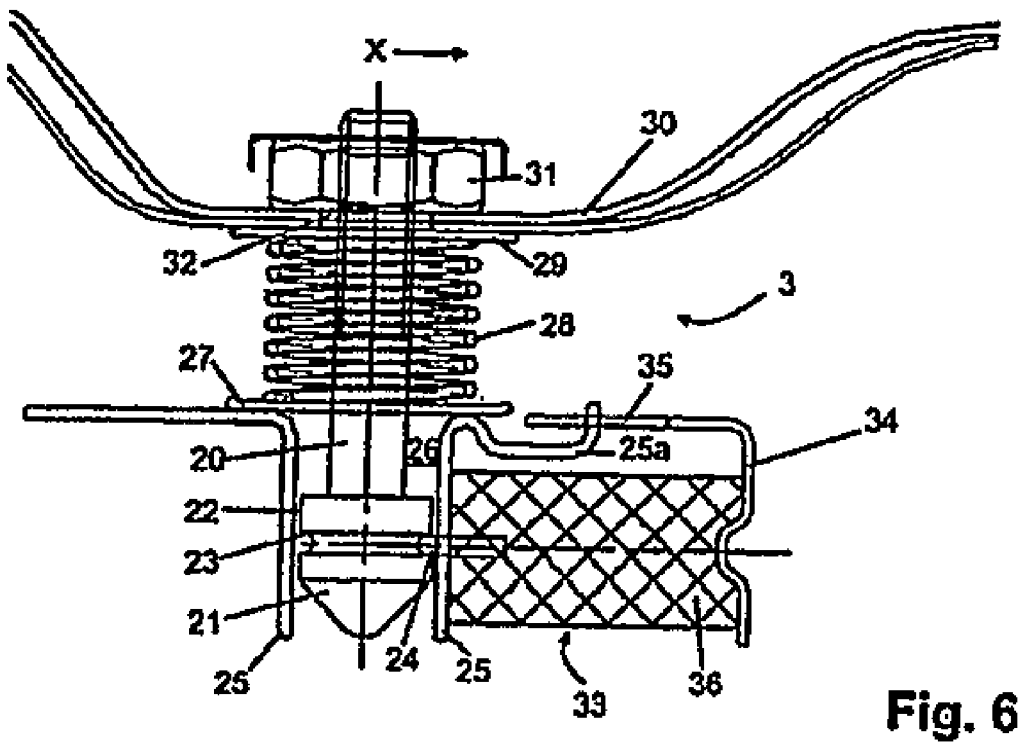

Signed and Sealed this

Tenth Day of July, 2007

JON W. DUDAS
*Director of the United States Patent and Trademark Office*